H. L. HAPPER.
ROASTER.
APPLICATION FILED NOV. 6, 1914. RENEWED APR. 7, 1916.

1,245,712.

Patented Nov. 6, 1917.

WITNESSES

INVENTOR
HERVEY L. HAPPER
BY
ATTORNEYS

UNITED STATES PATENT OFFICE.

HERVEY L. HAPPER, OF MILWAUKEE, WISCONSIN.

ROASTER.

1,245,712. Specification of Letters Patent. Patented Nov. 6, 1917.

Application filed November 6, 1914, Serial No. 870,594. Renewed April 7, 1916. Serial No. 89,724.

*To all whom it may concern:*

Be it known that I, HERVEY L. HAPPER, citizen of the United States, resident of Milwaukee, county of Milwaukee, State of Wisconsin, have invented certain new and useful Improvements in Roasters, of which the following is a specification.

The object of my invention is to provide an attachment for the cover of a meat roaster adapted to support strips of bacon to be cooked during the roasting operation, the bacon being held in place even when the cover is turned on one side or inverted.

A further object is to provide a support for giblets, mushrooms, and other articles of food, which may be placed in the top of the roaster and thoroughly cooked.

A further object is to provide a form of cover which will collect the steam from the cooking meat and direct the condensation downwardly upon the meat, mingling it with the juices of the food articles supported in the cover.

Other objects of the invention will appear from the following detailed description.

The invention consists generally in various constructions and combinations, all as hereinafter described and particularly pointed out in the claims.

Figure 1:
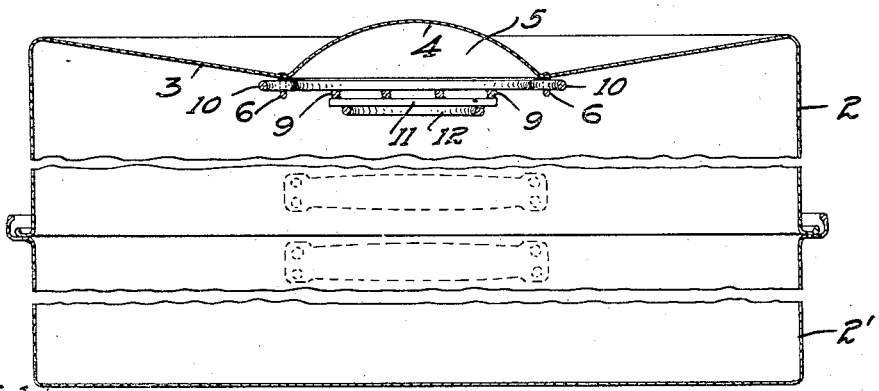
Figure 2:
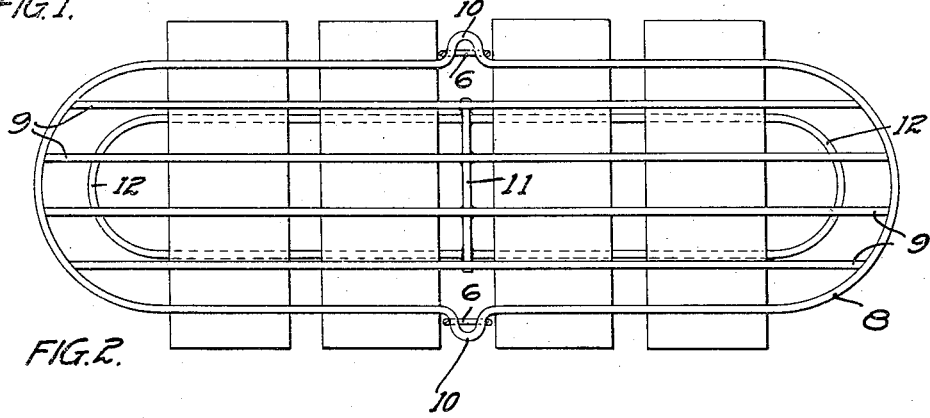
Figure 3:
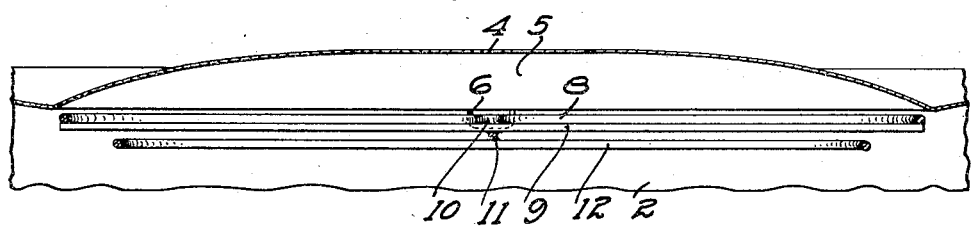
Figure 4:
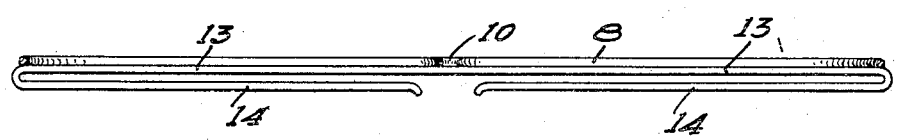
Figure 5:
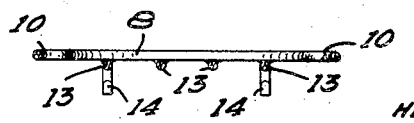

In the accompanying drawings forming part of this specification,

Figure 1 is a transverse sectional view through a meat roaster embodying my invention, Fig. 2 is a detail view, showing the means for suspending the bacon supporting device in the cover of the roaster, Fig. 3 is a longitudinal sectional view of the cover and the bacon supporting device, Fig. 4 is a longitudinal sectional view of a modified construction, Fig. 5 is a cross sectional view of the same.

In the drawing, 2' indicates the base and 2 represents the top or cover of the roaster, having an upper wall 3 that is concave for the purpose of directing the condensation of the steam from the cooking food inwardly toward the middle portion of the roaster. A dome 4 is centrally located in the upper wall of the cover, extending lengthwise thereof over the middle portion of the roaster and for a comparatively short distance upon each side of the longitudinal middle portion. This dome forms an elongated, comparatively narrow chamber 5 in the cover of the roaster, and on each side of said chamber depending loops or hangers 6 are provided. 8 represents the outer longitudinal rails of a grate, preferably composed of wire of suitable gage, and having curved ends and bars 9 extending lengthwise of said grate between the said ends, parallel with one another and with the rails 8. The rails 8 are preferably provided with outwardly projecting lugs 10 formed therein near the middle of the grate, and these lugs are adapted to enter the loops 6 and support the grate securely against the underside of the cover top and beneath the chamber 5, the rails 8 being sufficiently flexible to allow them to be pressed inwardly until the lugs are in position to enter the loops. The middle portion of the grate is preferably provided with a cross bar 11 to which the middle portion of a supplementary grate 12, also of wire, is secured. This grate 12 is preferably oval in form, and a little shorter than the main grate, and spaced from the bars thereof sufficiently to allow strips of bacon to be inserted between the bars of the two grates, the pressure of the bars and the rails 8 on the bacon being sufficient to hold the strips in place during the roasting operation or when the cover is inverted. When the roasting operation has been completed, the cover is inverted and with a fork the now thoroughly cooked bacon can be moved out from the space between the bars of the grate without the necessity of detaching the grate from the cover. This provision for holding the strips of bacon or other article of food in place by engagement with the bars of the grate I regard as an important feature of my invention, as it allows the cover to be handled without danger of shifting the position of the food articles in the top thereof.

The chamber 5 forms an air space between the grate and the top of the dome in which the condensation may collect and flow downwardly upon the cooking meat, and this space may also be utilized to accommodate giblets, mushrooms, and the like, which may be placed on the grate and cooked with the contents of the roaster.

Whenever desired, the grate may be removed, and if an unusually large turkey or other fowl is placed in the roaster, the chamber 5 may be found particularly convenient to receive the breast bone and thereby permit the roasting of much larger fowl than would be ordinarily possible in a roaster as usually constructed.

In Figs. 3 and 4 I have shown a modified construction, which consists in providing the two outer grate bars 13 with downwardly and inwardly turned extensions 14 terminating near the middle portion of the grate and forming supports for strips of bacon or like articles placed thereon. This form of grate is supported beneath the chamber in the top of the cover by means of the lugs and loops, as described with reference to Figs. 1 and 2. The grate may be removed from the cover by pressure on the side rails with a fork or other article, but generally, unless food is placed above the grate, its removal from the cover after the roasting operation will be unnecessary, as articles placed between the upper and lower portions of the grate can be easily and quickly removed when the cover is inverted.

The grate device may be made in various shapes and sizes and in various ways the details of construction may be modified and still be within the scope of my invention.

I claim as my invention:

1. A roaster having a cover provided with a central dome forming a recess in the underside of the cover, a grate supported from the under side of the cover beneath said recess and comprising upper and lower portions having a space between them adapted to receive strips of bacon and the like, whereby the article being roasted will be basted by the juices of the bacon or the like.

2. A roaster having a cover provided with a centrally arranged dome-like portion forming a recess in the under side of the cover, and loops depending on each side of said recess, a grate having side rails of spring material and lugs formed therein to engage said loops, said grate being adapted to support strips of bacon and the like inserted between the bars of the grate.

3. A roaster cover in combination with a grate fitting the top of the roaster and having rails of spring material adapted to engage supporting means in the top of the roaster and be held in such engagement by the spring tension of said rails, said grate being adapted to support strips of bacon and the like inserted between the bars thereof.

4. A roaster comprising a pan having a cover and a grate, materially smaller in area than the cover, fitting therein and means supporting the grate in the top of the cover, said grate having upper and lower bars spaced apart and adapted to receive strips of bacon placed between the bars, whereby the juices from the bacon will fall on the article being roasted.

5. A roaster cover having a concave top provided with a convex, comparatively narrow middle portion forming an arch in the middle of the cover, a grate having side rails of spring material fitting the top of the cover beneath said concave portion, said cover having depending means engaging the said rails for supporting said grate, said grate having upper and lower bars spaced apart to receive strips of bacon and the like inserted between them.

6. A roaster cover having a dome formed in the middle portion thereof, materially smaller in area than the cover, oval-shaped, substantially, in longitudinal section and providing a chamber in the top of the cover, a grate also oval in form, fitting against the wall of said cover beneath said dome, said grate having upper and lower bars between which articles of food, such as bacon, can be placed and held by said bars against premature movement, and means temporarily supporting said grate on said cover.

7. A roaster having a cover provided with a centrally arranged dome-like portion forming a recess in the top of the cover, of a grate fitting against the edges of said recess, said grate having yielding side rails and lugs formed thereon and supports depending from said cover with which said lugs engage.

8. A roaster comprising a pan having a cover in combination with a grate mounted in the center of the top thereof, said grate being adapted to support strips of bacon and the like for basting the material being roasted and having means for holding the bacon against premature movement in the grate when the cover is inverted.

9. A meat roaster comprising a base, a cover therefor, a support for bacon and the like, and resilient means arranged beneath and coöperating with the underside of the cover for detachably clasping said support in position.

10. A roaster comprising a base, a cover for the base, and a basting-means support, one of said parts provided with resilient means at the underside of the cover for clasping said support to the cover.

11. A meat roaster comprising a base, a cover therefor, and a support for bacon and the like, arranged beneath the cover, the sides of said support being resilient and adapted to engage with a part of the cover to sustain the support in position.

12. A roaster cover, formed with a dome in its top and with sustaining means adjacent to the dome, and a support for basting means located at the base of the dome, said support being provided with resilient means for engagement with said sustaining means.

13. A roaster cover formed with a centrally disposed dome spaced from the sides of the cover, and a support for basting-means positioned at the base of the dome, the sides of said support being resilient and adapted to engage with a part of the cover to sustain the support in position at the base of the dome.

14. A roaster comprising a base in which the meat is placed, a cover therefor, a support for a basting means carried by said cover above the middle portion of said base, said support being composed of upper and lower members having bars for engaging the basting means, such as bacon, between them.

15. A roaster comprising a base, a cover therefor, a carrier for bacon and the like formed of spring material, and means on the under side of the cover for attaching said support thereto.

16. A roaster having a cover provided with a centrally disposed dome, an apertured basting-means support sustained across the base of the dome, and means for securing the basting-means against the under side of the apertured support.

In witness whereof, I have hereunto set my hand this 29th day of October, 1914.

HERVEY L. HAPPER.

Witnesses:
GENEVIEVE E. SORENSEN,
EDWARD A. PAUL.

Copies of this patent may be obtained for five cents each, by addressing the "Commissioner of Patents, Washington, D. C."